US011945309B2

(12) United States Patent
Matsui et al.

(10) Patent No.: US 11,945,309 B2
(45) Date of Patent: Apr. 2, 2024

(54) DISPLAY SYSTEM

(71) Applicant: Panasonic Intellectual Property Management Co., Ltd., Osaka (JP)

(72) Inventors: Satoshi Matsui, Kyoto (JP); Norikazu Katsuyama, Osaka (JP)

(73) Assignee: PANASONIC INTELLECTUAL PROPERTY MANAGEMENT CO., LTD., Osaka (JP)

(*) Notice: Subject to any disclaimer, the term of this patent is extended or adjusted under 35 U.S.C. 154(b) by 71 days.

(21) Appl. No.: 17/529,696

(22) Filed: Nov. 18, 2021

(65) Prior Publication Data

US 2022/0072959 A1 Mar. 10, 2022

Related U.S. Application Data

(63) Continuation of application No. PCT/JP2020/017558, filed on Apr. 23, 2020.

(30) Foreign Application Priority Data

May 29, 2019 (JP) .................................. 2019-100455

(51) Int. Cl.
*B60K 37/02* (2006.01)

(52) U.S. Cl.
CPC ...... *B60K 37/02* (2013.01); *B60K 2370/1529* (2019.05); *B60K 2370/166* (2019.05);
(Continued)

(58) Field of Classification Search
CPC ........ B60K 37/02; B60K 37/06; B60K 35/00; B60Y 2200/11; B60Y 2400/301;
(Continued)

(56) References Cited

U.S. PATENT DOCUMENTS

2016/0216521 A1\* 7/2016 Yachida .................... B60R 1/00
2017/0038595 A1\* 2/2017 Kutomi .................... G09G 5/38
(Continued)

FOREIGN PATENT DOCUMENTS

| JP | 2015-101311 | 6/2015 |
| JP | 2019-73272 | 5/2019 |

(Continued)

OTHER PUBLICATIONS

International Preliminary Report on Patentability dated Dec. 2, 2021 in corresponding International (PCT) Patent Application No. PCT/JP2020/017558.
(Continued)

*Primary Examiner* — Christopher E Leiby
(74) *Attorney, Agent, or Firm* — Wenderoth, Lind & Ponack, L.L.P.

(57) ABSTRACT

A display system includes a display processing device that controls display of an image, a posture detection device that detects a posture change amount of moving body, a correction processing device that sets a correction amount of display position of the image, a display determiner that determines whether or not to display the image, and a gradient change detector that detects a gradient change of a traveling path. The gradient change detector detects that a posture change of the moving body is started when an absolute value of the posture change amount is larger than a first threshold, and that the posture change is completed when the absolute value becomes smaller than a second threshold after start of the posture change. The display determiner determines not to display the image from start of the posture change until completion of the posture change.

20 Claims, 13 Drawing Sheets

(52) U.S. Cl.
CPC ....... *B60K 2370/52* (2019.05); *B60Y 2200/11* (2013.01); *B60Y 2400/301* (2013.01); *B60Y 2400/92* (2013.01)

(58) Field of Classification Search
CPC .... B60Y 2400/92; G09G 3/001; G09G 3/002; G09G 2340/12; G09G 2340/0464; G09G 2380/10; G09G 5/00; B60R 2300/308; B60R 2300/605; B60R 1/00; G02B 2027/0183; G02B 27/0101
See application file for complete search history.

(56) References Cited

U.S. PATENT DOCUMENTS

| | | | |
|---|---|---|---|
| 2017/0169612 A1 | 6/2017 | Cashen et al. | |
| 2019/0025580 A1 | 1/2019 | Nagano et al. | |
| 2020/0064640 A1* | 2/2020 | Nagano | G09G 3/001 |
| 2020/0269696 A1* | 8/2020 | Banno | G02B 27/0101 |
| 2020/0311442 A1 | 10/2020 | Shibata et al. | |
| 2020/0333608 A1 | 10/2020 | Katagiri et al. | |
| 2021/0389596 A1* | 12/2021 | Fujita | G06T 15/20 |

FOREIGN PATENT DOCUMENTS

| | | |
|---|---|---|
| WO | 2015/159500 | 10/2015 |
| WO | 2017/134866 | 8/2017 |
| WO | 2019/074114 | 4/2019 |
| WO | 2019/092996 | 5/2019 |

OTHER PUBLICATIONS

Extended European Search Report dated Jun. 27, 2022 in European Patent Application No. 20814675.3.
European Search Report dated Feb. 16, 2023 in corresponding Europe Patent Application No. 20814675.3.
International Search Report dated Jul. 21, 2020 in International (PCT) Application No. PCT/JP2020/017558 with English translation.

* cited by examiner

DISPLAY SYSTEM

CROSS-REFERENCE TO RELATED APPLICATIONS

This is continuation application of International Application No. PCT/JP2020/017558, with an international filing date of Apr. 23, 2020, which claims priority of Japanese Patent Application No. 2019-100455 filed on May 29, 2019, the content of which is incorporated herein by reference.

BACKGROUND OF INVENTION

1. Technical Field

The present disclosure relates to a display system that controls a display position of an image according to the movement of a moving body.

2. Description of Related Art

JP 2015-101311 discloses a vehicle information projection system that performs augmented reality (AR) display using a head-up display (HUD) device. The HUD device projects light representing a virtual image on the windshield of a vehicle so that a viewer who is an occupant of the vehicle visually recognizes the virtual image together with an actual view of the outside world of the vehicle. For example, a virtual image representing a guide route of the vehicle is displayed in association with a display target (for example, road) in the actual view. In this manner, the occupant can confirm the guide route while visually recognizing the actual view. The vehicle information projection system of JP 2015-101311 includes a vehicle speed sensor and corrects a display position of the virtual image according to acceleration. This restricts generation of position displacement of the virtual image when the vehicle is suddenly decelerated and suddenly accelerated.

SUMMARY

The present disclosure provides a display system that reduces sense of incongruity or discomfort given to a viewer when a display position of an image is corrected.

A display system of the present disclosure includes a display processing device that controls display of an image, a posture detection device that detects a posture change amount of a moving body, a correction processing device that sets a correction amount of a display position of the image based on the posture change amount, and a display determiner that determines whether or not to display the image. The display processing device controls display of the image based on a determination result of the display determiner and the correction amount.

These general and specific aspects may be realized by a system, a method, and a computer program, and a combination of these.

According to the display system of the present disclosure, it is possible to reduce a sense of incongruity or discomfort given to the viewer when a display position of an image is corrected.

DETAILED EMBODIMENTS

Findings that Form the Basis of the Present Disclosure

As a technique for suppressing display displacement of a head-up display (HUD) device due to a posture change of a moving body caused by unevenness of a road surface or acceleration/deceleration, vibration correction in which a variation amount of the posture change of the moving body is detected using a gyro sensor of the like, and the display displacement is corrected on the basis of the variation amount.

A correction range that can be supported by the vibration correction is limited by hardware constraints such as a display angle of view, a detection range of a sensor, or the like. In a case where the posture change of the moving body exceeds the correction range of the vibration correction, there is a problem that a virtual image could be displayed at an unintended position and the viewer is given a sense of incongruity and discomfort. Further, even in a case where the moving body is making a turn and a superimposition destination of a virtual image cannot be visually recognized, there is a case where the viewer is similarly given a sense of incongruity and discomfort.

Further, in a case where the moving body is traveling in a section where the gradient of a road surface changes where a flat road is connected to a slope, that is, a difference between the gradient of the road surface at the position of the own vehicle of a superimposition destination changes, and thus a virtual image cannot be displayed at an intended position. For this reason, discomfort is given to the viewer, and the safety is lowered.

A display system of the present disclosure includes a display processing device, a posture detection device, a correction processing device, and a display determiner that determines whether or not to display a virtual image, and the display processing device controls display of a virtual image based on a display determination result of the display determiner. With such a configuration, when a display position of a virtual image is corrected, a sense of incongruity or discomfort given to the viewer can be reduced.

First Embodiment

Hereinafter, the first embodiment will be described with reference to the drawings. In the first embodiment, a case where the moving body is a vehicle such as an automobile and the display system is a head-up display (HUD) system that displays a virtual image as an image in front of the windshield of the vehicle will be described as an example.

1. Configuration of Display System

Figure 1:
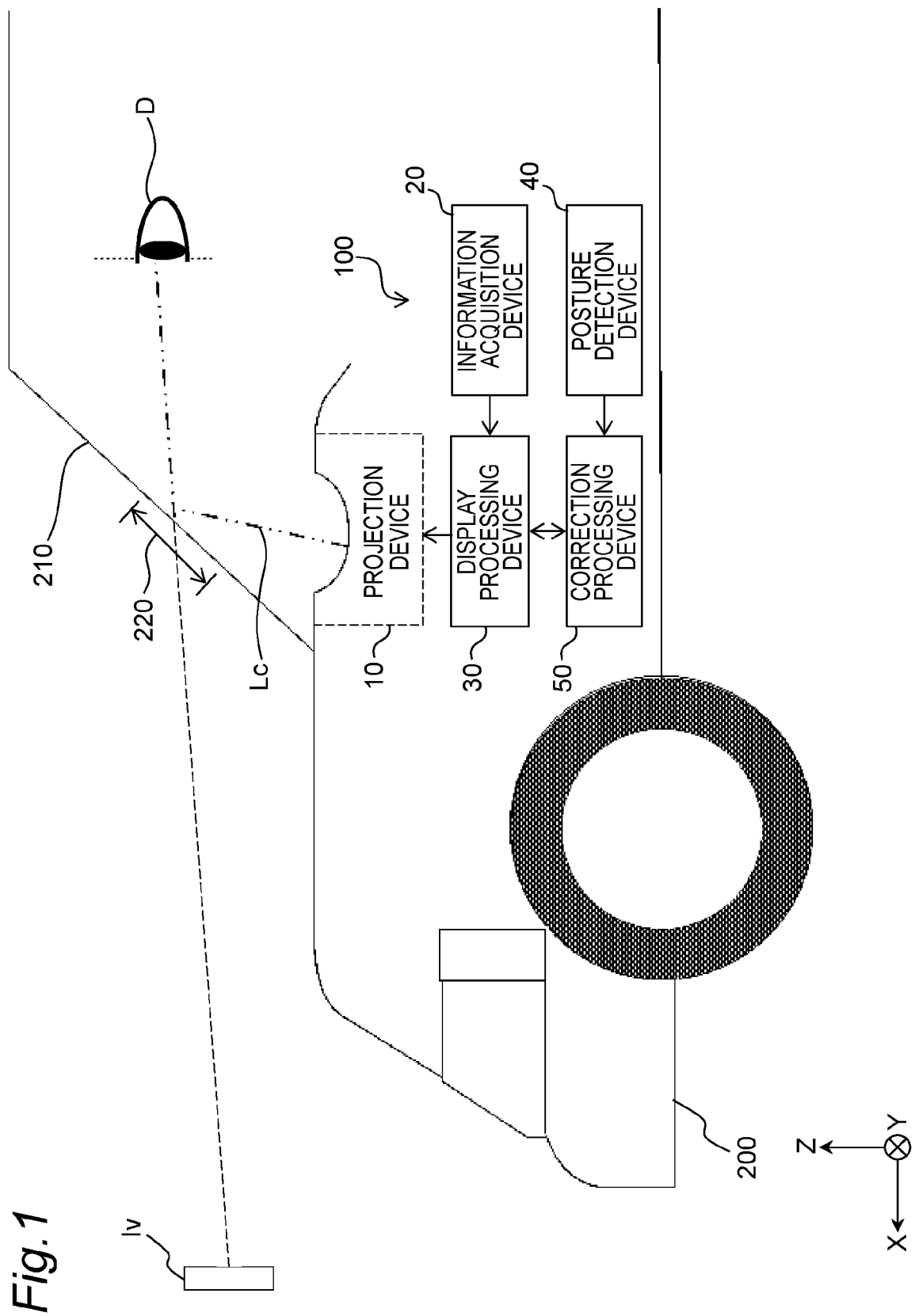
FIG. 1 is a diagram for explaining a head-up display (HUD).

FIG. 1 is a diagram for explaining the HUD system. In FIG. 1, a roll axis of a vehicle 200 is the X axis, a pitch axis of the vehicle 200 is the Y axis, and a yaw axis of the vehicle 200 is the Z axis. That is, the X axis is an axis that is orthogonal to the Y axis and the Z axis and is along a line-of-sight direction of an occupant D who visually recognizes a virtual image Iv. The Y axis is an axis along the left-right direction when viewed from the occupant D who visually recognizes the virtual image Iv. The Z axis is an axis along the height direction of the vehicle 200.

A display system 100 of the present embodiment is an HUD system that performs what is called augmented reality (AR) display in which the virtual image Iv is superimposed on an actual view in front of a windshield 210 of the vehicle 200. The virtual image Iv indicates predetermined information. For example, the virtual image Iv is a figure and a character indicating a route for guiding to a destination, an estimated time of arrival at the destination, a traveling direction, a speed, various warnings, and the like. The display system 100 is installed in the vehicle 200 and projects display light Lc representing the virtual image Iv into a display area 220 of the windshield 210 of the vehicle 200. In the present embodiment, the display area 220 is a partial area of the windshield 210. Note that the display area 220 may be the entire area of the windshield 210. The display light Lc is reflected by the windshield 210 toward the inside of the vehicle. In this manner, the occupant (viewer) D in the vehicle 200 visually recognizes the reflected display light Lc as the virtual image Iv in front of the vehicle 200.

The display system 100 includes a projection device 10, an information acquisition device 20, a display processing device 30, a posture detection device 40, and a correction processing device 50.

The projection device 10 projects the display light Lc representing the virtual image Iv into the display area 220. The projection device 10 includes, for example, a liquid crystal display element that displays an image of the virtual image Iv, a light source such as an LED that illuminates that liquid crystal display element, a mirror and a lens that reflect that display light Lc of the image displayed by the liquid crystal display element onto the display area 220, and the like. The projection device 10 in installed, for example, in the dashboard of the vehicle 200.

The information acquisition device 20 acquires a position of the vehicle 200 and information outside the vehicle. Specifically, the information acquisition device 20 measures a position of the vehicle 200 and generates position information indicating the position. The information acquisition device 20 further acquires outside-vehicle information indicating an object, a distance to the object, and the like. The object is a person, a sign, a road, or the like. The information acquisition device 20 outputs vehicle-related information including at least one of the position information of the vehicle 200 or the outside-vehicle information. Note that the information acquisition device 20 is not an essential configuration, and does not need to be included in the display system 100.

The display processing device 30 controls the display of the virtual image Iv based on the vehicle-related information and the like obtained from the information acquisition device 20 and outputs image data of the virtual image Iv to the projection device 10. The display processing device 30 may control the display of the virtual image Iv based on a display timing (display time) of the virtual image Iv or a combination of the vehicle-related information and the display timing. The display timing is, for example, repetition of display for ten seconds and non-display for one second.

The posture detection device 40 detects a posture change of the vehicle 200. In the present embodiment, the posture detection device 40 includes, for example, a gyro sensor 41 that detects an angular velocity. The gyro sensor 41 outputs the detected angular velocity to the correction processing device 50 as posture change information of the vehicle 200. The gyro sensor 41 may detect a pitch angle or a yaw angle of the vehicle 200 instead of an angular velocity.

The correction processing device 50 calculates a correction amount of the display position of the virtual image Iv based on the posture change information of the vehicle 200 output from the posture detection device 40.

Figure 2:
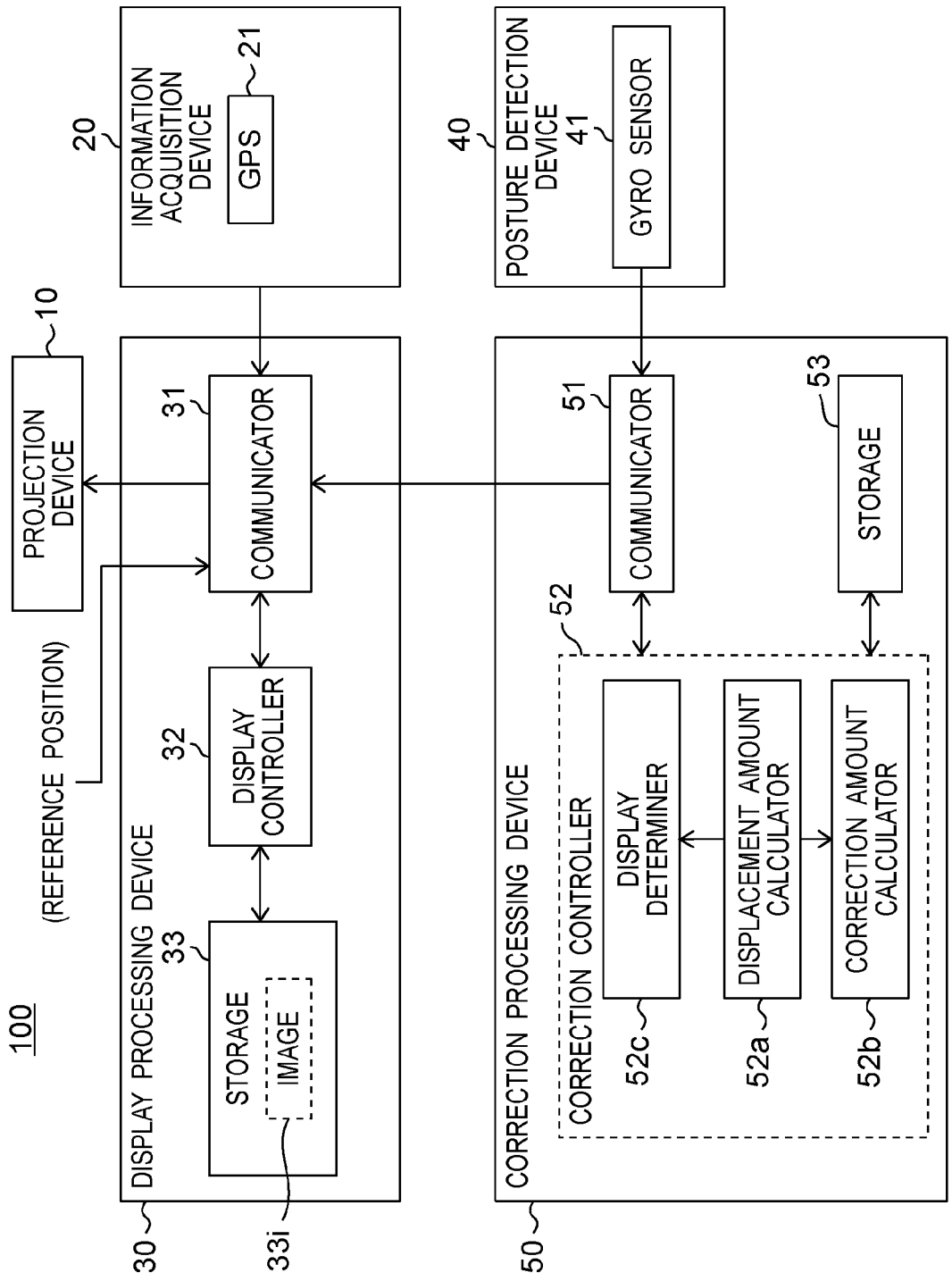
FIG. 2 is a block diagram showing an internal configuration of a display system according to a first embodiment.

FIG. 2 is a block diagram showing an internal configuration of the display system 100.

In the present embodiment, the information acquisition device 20 includes a global positioning system (GPS) module 21 that detects a position indicating the current position of the vehicle 200 in the geographical coordinate system. Specifically, the GPS module 21 receives radio waves from GPS satellites and measure the latitude and longitude of the receiving point. The GPS module 21 generates position information indicating the measure latitude and longitude. The information acquisition device 20 may further include a camera 22 that captures an outside view and generates captured-image data. The information acquisition device 20, for example, identifies an object from the captured image data by image processing and measures a distance to the object. The information acquisition device 20 generates, as the outside-vehicle information, information indicating an object, a distance to the object, and the like. The information acquisition device 20 outputs the vehicle-related information including the position information and the outside-vehicle information to the display processing device 30. Note that the captured image data generated by the camera may by output to the display processing device 30.

The display processing device 30 includes a communicator 31, a display controller 32, and a storage 33.

The communicator 31 includes a circuit that communicates with external devices in compliance with a predetermined communication standard (for example, LAN, Wi-Fi (registered trademark), Bluetooth (registered trademark), USB, HDMI (registered trademark), controller area network (CAN), and serial peripheral interface (SPI)).

The display controller 32 can be realized by a semiconductor element or the like. The display controller 32 can be composed of, for example, a microcomputer, a CPU, an MPU, a GPU, a DSP, an FPGA, and an ASIC. A function of the display controller 32 may by configured only by hardware, or may be realized by combining hardware and software. The display controller 32 realizes a predetermined function by reading data and a program stored in the storage 33 and performing various types arithmetic processing.

The storage 33 is a storage medium that stores a program and data required to realize a function of the display processing device 30. The storage 33 can be realized by, for example, a hard disk (HDD), an SSD, a RAM, a DRAM, a ferroelectric memory, a flash memory, a magnetic disk, or a combination of these.

The storage 33 stores a plurality of pieces of image data 331 representing the virtual image Iv. The display controller 32 determines the virtual image Iv to be displayed based on the vehicle-related information obtained from the information acquisition device 20. The display controller 32 reads out the image data 331 of the determined virtual image Iv from the storage 33 and outputs the data to the projection device 10. Furthermore, the display controller 32 sets the display position of the virtual image Iv.

The correction processing device 50 includes a communicator 51, a correction controller 52, and a storage 53.

The communicator 51 includes a circuit that communicates with external devices in compliance with a predetermined communication standard (for example, LAN, Wi-Fi (registered trademark), Bluetooth (registered trademark), USB, HDMI (registered trademark), controller area network (CAN), and serial peripheral interface (SPI)).

The correction controller 52 is an arithmetic device that can be realized by a semiconductor element or the like. The correction controller 52 can be composed of, for example, a microcomputer, a CPU, an MPU, a GPU, a DSP, an FPGA, and an ASIC. A function of the display controller 32 may be configured only by hardware, or may be realized by combining hardware and software. The correction controller 52 realizes a predetermined function by reading data and a program stored in the storage 53 in the correction processing device 50 and performing various types of arithmetic processing.

The correction controller 52 includes a displacement amount calculator 52a, a correction amount calculator 52b, and a display determiner 52c as a functional configuration.

The displacement amount calculator 52a calculates the posture (angle displacement amount) of the vehicle 200 based on the posture change information output by the posture detection device 40. For example, the displacement amount calculator 52a calculates an angle (a pitch angle) around a pitch axis of the vehicle 200 by integrating the angular velocity detected by the gyro sensor 41. In this manner, a displacement amount (angle) of the vehicle 200 in a rotation direction around the Y axis (pitch axis) shown in FIG. 1 can be calculated. Note that, in the present embodiment, a pitch angle and a yaw angle are calculated. However, a roll angle may be calculated. Further, for example, all angles around the X axis, the Y axis, and the Z axis may be calculated. Note that, in a case where the posture detection device 40 outputs angle information, the displacement amount calculator 52a may use the angle information output from the posture detection device 40 as a displacement amount of an angle.

The correction amount calculator 52b calculates a correction amount of the display position of the virtual image Iv according to the posture (angle displacement amount) of the vehicle 200. Specifically, the correction amount calculator 52b converts the displacement amount of the angle (pitch angle) calculated by the displacement amount calculator 52a into the number of pixels, and determines a correction amount by which the number of pixels corresponding to the displacement (hereinafter, also referred to as the "the number of displacement pixels") is eliminated. For example, the displacement amount calculator 52a determines a correction amount by which a displacement amount of the yaw angle in eliminated. The correction amount calculator 52b outputs the calculated correction amount to the display processing device 30. Note that, in the present embodiment, the correction amount around the pitch axis is calculated. Furthermore, the correction amount around the yaw axis and the roll axis may be further calculated. As to a roll angle, a correction amount by which a displacement amount of the roll angle is determined without conversion of the angle.

The display determiner 52c compares the magnitude relationship between an output of the posture detection device 40 or an absolute value of a result (herinafter, referred to as a variation amount X) of calculation processing of the output of the posture detection device 40 and a threshold a, and determines whether or not to display the virtual image Iv. The calculation processing of an output of the posture detection device 40 may be performed by the posture detection device 40 or the displacement amount calculator 52a or the display determiner 52c of the correction processing device 50, or another configuration.

The variation amount X is, for example, a variation amount in certain time of angle obtained by integrating the angular velocity detected by the gyro sensor 41. In the present embodiment, an angle (yaw angle) around the yaw axis of the vehicle 200 is calculated by integrating and calculating the angular velocity detected by the gyro sensor 41. The yaw angle of the vehicle 200 is the posture change amount. The variation amount X of the vehicle 200 in the rotation direction about the Z axis (yaw axis) illustrated in FIG. 1 can be calculated based on the posture change amount. That is, in the present embodiment, a variation amount of the yaw angle in a predetermined unit time is calculated as the variation amount X. Note that the variation amount X is not limited to the variation amount of the yaw angle in a predetermined unit time. The posture change amount of the vehicle 200 may be directly set as the variation amount X. For example, the posture change amount that is the yaw angle of the vehicle 200 may be used directly as the variation amount X.

The display determiner 52c outputs, for example, Boolean binary data as a display determination result. The display determiner 52c outputs TRUE when an absolute value of the variation amount X is less than the threshold a, and outputs FALSE when the absolute value of the variation amount X is equal to or more than the threshold a. That is, the display determiner 52c determines that the display is ON when the absolute value of the variation amount X is less than the threshold a, determines that the display is OFF when the absolute value of the variation amount X is equal to or more than the threshold a, and outputs the result. Data of the display determiner 52c is not limited to a Boolean type, and may be an integer type. Further, the data may be output in other data types.

The storage 52 is a storage medium that stores a program and data required to realize a function of the correction controller 52. Therefore, for example, a program and data necessary for causing an arithmetic device such as a processor to function as the display determiner 52c are also stored in the storage 52. The storage 53 can be realized by, for example, a hard disk (HDD), an SSD, a RAM, a DRAM, a ferroelectric memory, a flash memory, a magnetic disk, or a combination of these.

The correction processing device 50 outputs a correction amount and a display determination result to the display processing device 30.

Figure 3A:
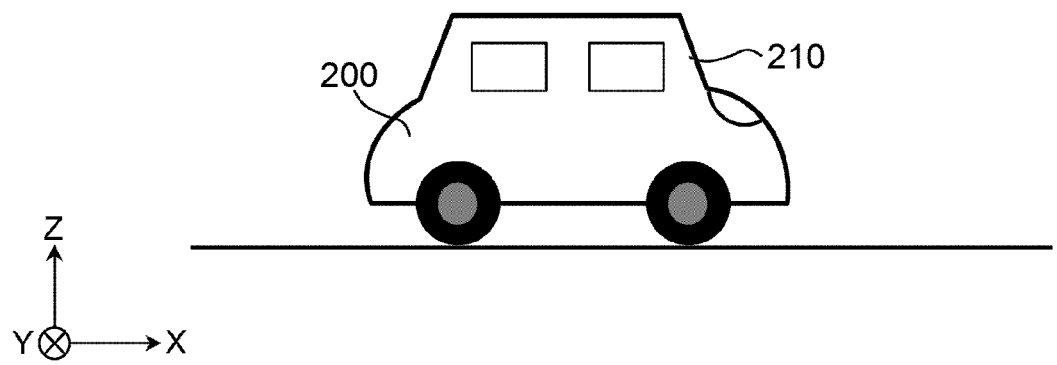
FIG. 3A is a diagram showing an example when a vehicle does not lean.
Figure 3B:
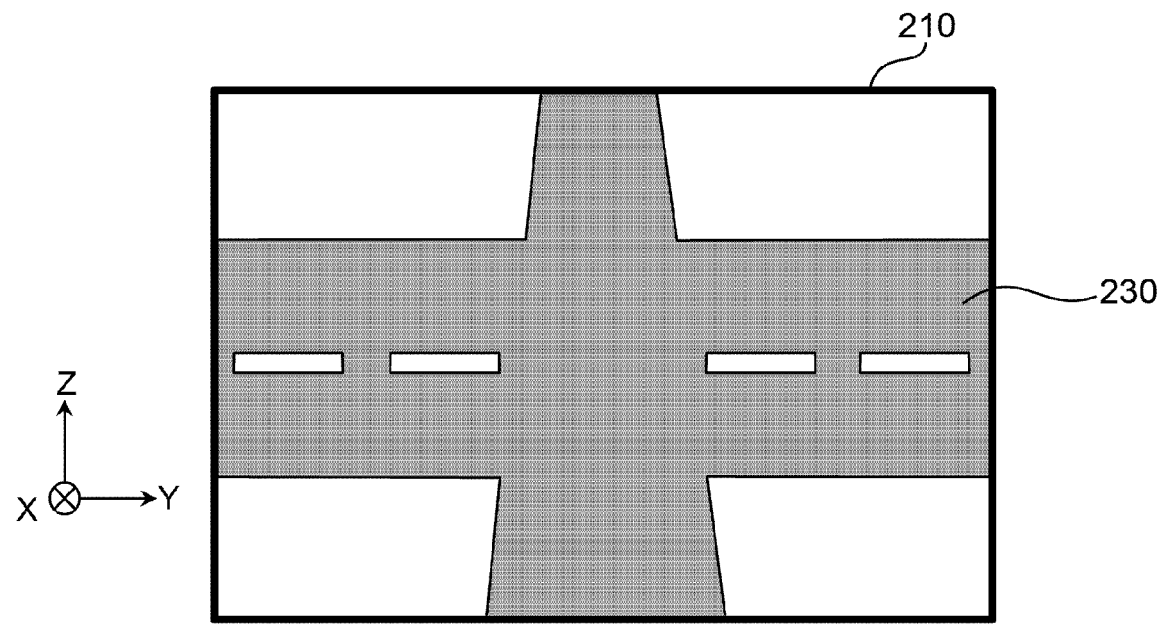
FIG. 3B is a diagram showing an example of an actual view as seen from a windshield.
Figure 3C:
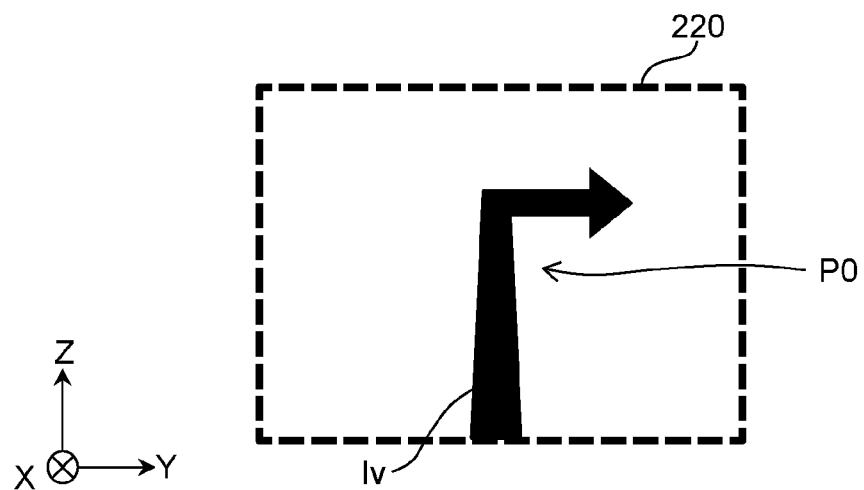
FIG. 3C is a diagram showing an example in which a virtual image is displayed at a reference position.
Figure 3D:
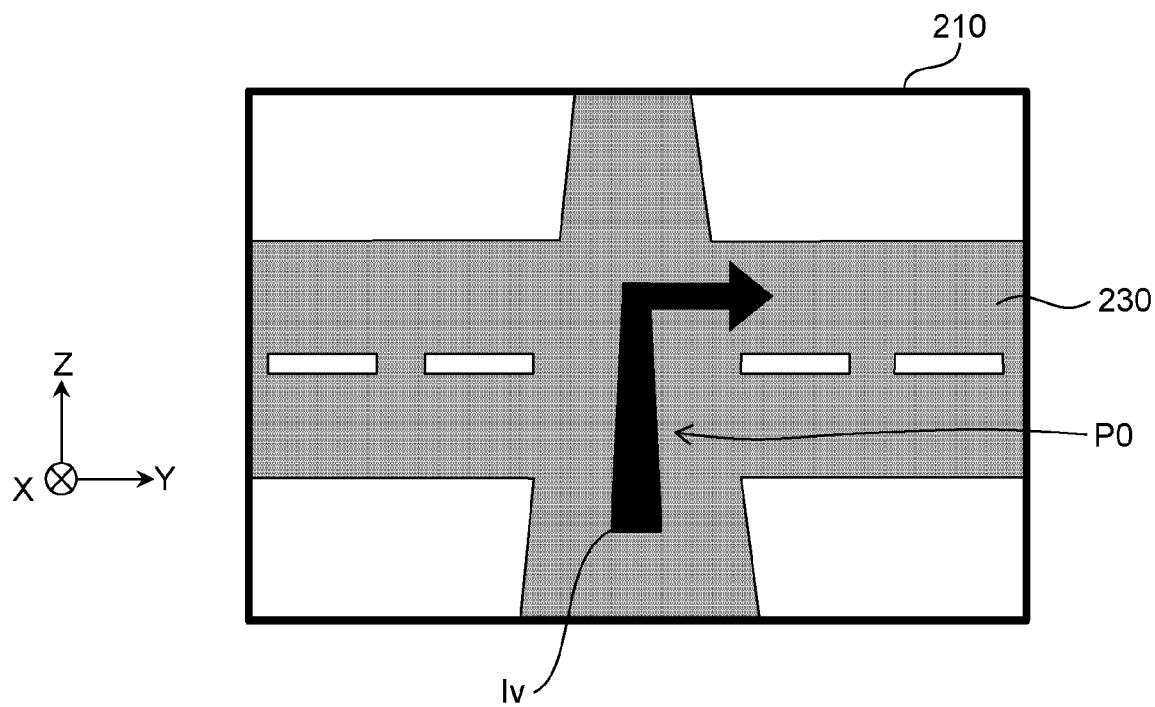
FIG. 3D is a diagram showing an example of augmented reality (AR) display.

AR display will be described with reference to FIGS. 3A to 3D. FIG. 3A shows an example when the vehicle 200 does not lean. FIG. 3B shows an example of an actual view seen from the windshield 210 of the vehicle 200 shown in FIG. 3A. FIG. 3C shows an example of the virtual image Iv seen from the display area 220. FIG. 3D shows an example in which the virtual image Iv shown in FIG. 3C is displayed in a manner superimposed on the actual view shown in FIG. 3B. The display system 100 superimposes the virtual image Iv shown in FIG. 3C on the actual view shown in FIG. 3B. A reference position (initial position) P0 of the virtual image Iv is a position determined based on a type of the virtual image Iv, a state of the vehicle 200 (position and posture), map data, and the like, and the reference position P0 is determined by an external device. For example, in a case where a display target 230 is a cruising lane and the virtual image Iv is an arrow indicating a traveling direction, the reference position P0 is a display position on liquid crystal display when a tip of an arrow indicated the center of the cruising lane. The reference position P0 is set, for example, at a position of a pixel on liquid crystal display corresponding to the values of the Y coordinate and the Z coordinate in the display area 220 in FIG. 3C. The reference position P0 is acquired from an external device. The external device can be composed of, for example, a microcomputer, a CPU, an MPU, a GPU, a DSP, an FPGA, or an ASIC and the GPS module 21. A function of the external device may be configured only by hardware, or may be realized by combining hardware and software. The reference position P0 output from the external device may change based on the number of occupants, a change in the load, and a variation in the posture due to a decrease in gasoline and the like, and may be, for example, different from the reference position (initial position) acquired first. Therefore, the display processing device 30 may change the reference position P0 acquired from the external device based on the number of occupants, the change in the load, and the variation in the posture due to the decrease in gasoline and the like. Note that the display processing device 30 may set the reference position P0 based on the vehicle-related information, the map data, and the like. The display processing device 30 may set the size of the virtual image Iv based on the vehicle-related information.

Figure 4A:
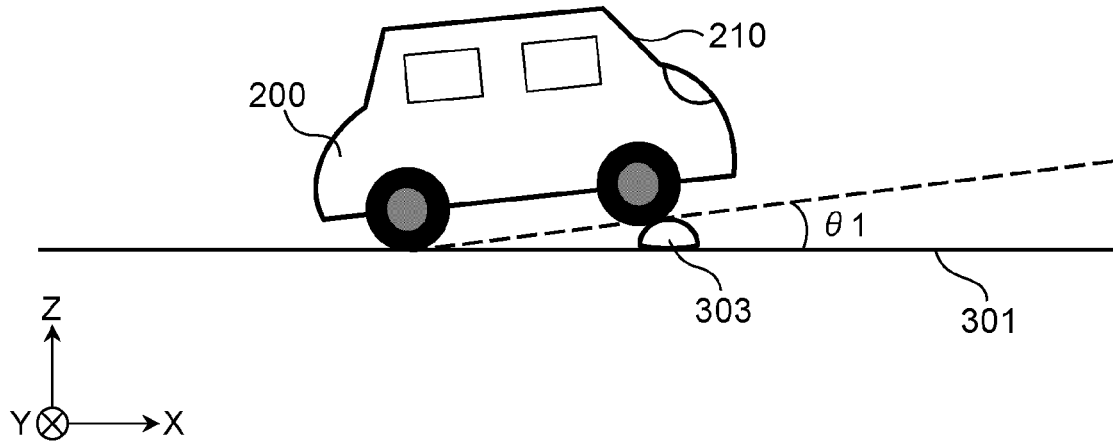
FIG. 4A is a diagram showing a rearward leaning posture of a vehicle.
Figure 4B:
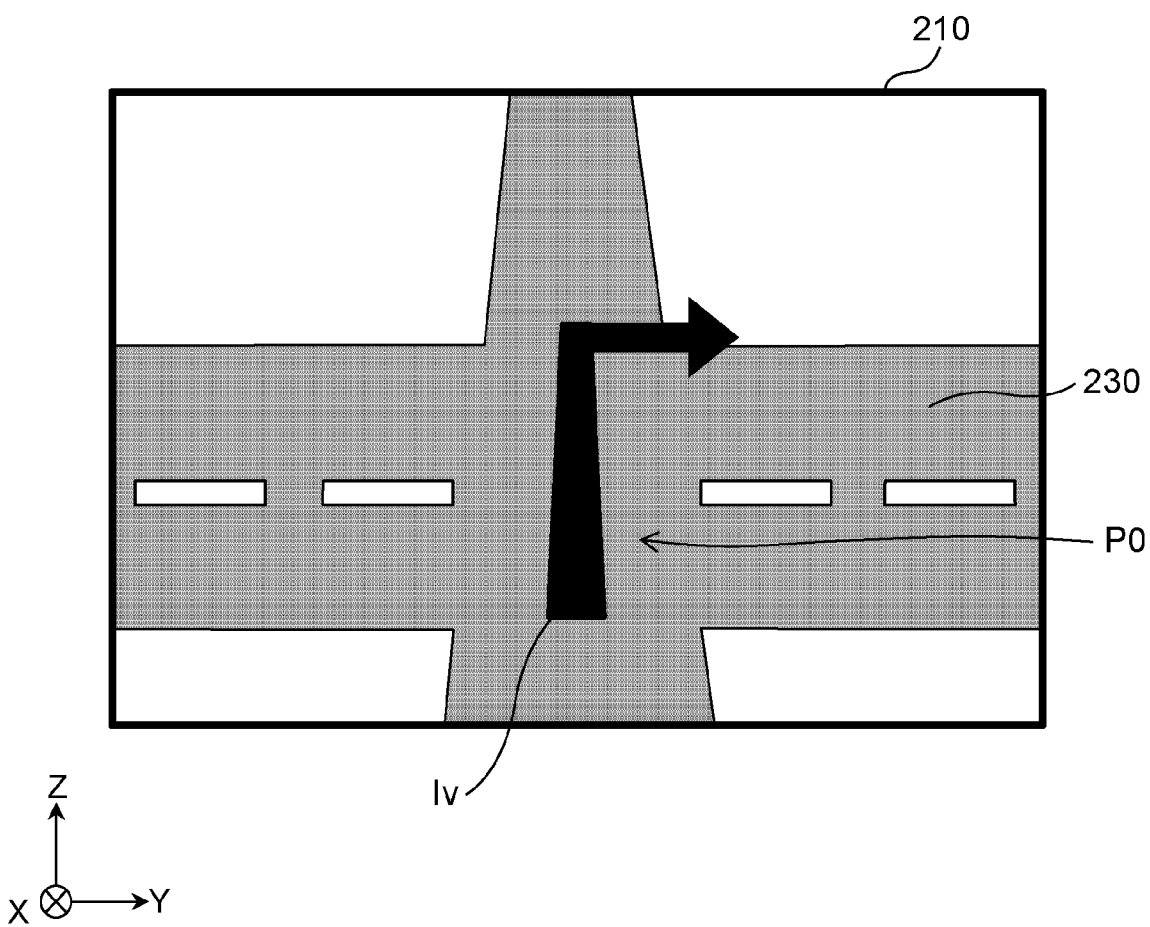
FIG. 4B is a diagram for explaining an example in which position displacement of a virtual image occurs when a vehicle is in a rearward leaning posture.
Figure 4C:
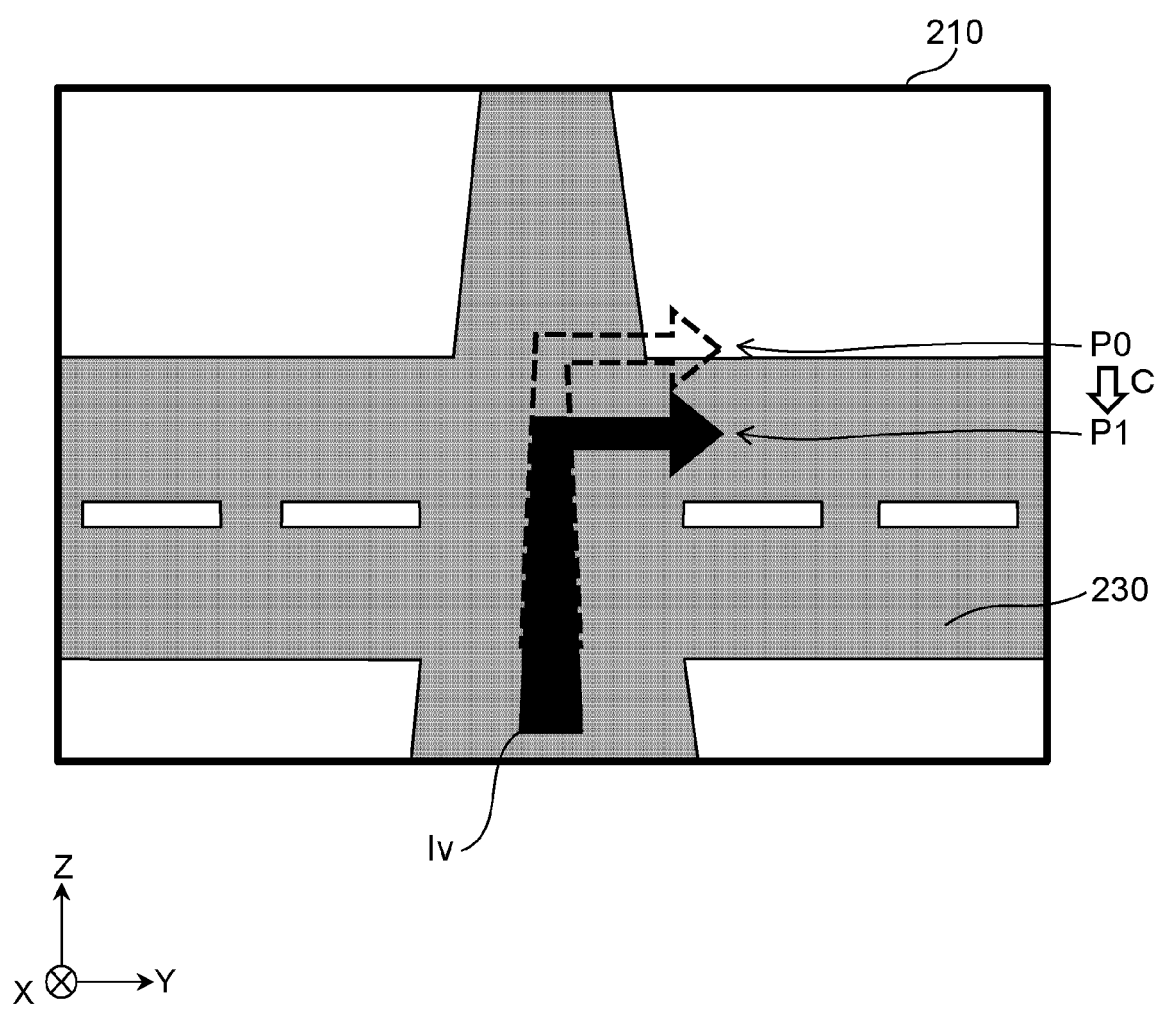
FIG. 4C is a diagram showing a display example of a virtual image after correction.

FIG. 4A shows an example of a state in which vehicle 200 is in a rearward leaning posture. FIG. 4B illustrates a case where the display position of the virtual image Iv is displaced from the display target 230 according to the posture change of the vehicle 200. FIG. 4C shows the display position of the virtual image Iv after correction.

The vehicle 200 may lean due to unevenness of the road surface, sudden acceleration or deceleration of the vehicle 200, or the like. For example, when the vehicle 200 runs on a projection portion 303 of a road surface 301, the vehicle 200 is in a rearward leaning posture as illustrated in FIG. 4A. In this case, as shown in FIG. 4B, the position of the display target 230 seen from the windshield 210 changes according to an inclination θ1 with respect to a track of the vehicle 200. For this reason, in a case where the virtual image Iv is displayed at the reference position P0, the virtual image Iv is displaced from the display target 230.

For example, as illustrated in FIG. 4B, when the vehicle 200 is in a rearward leaning posture due to the projecting portion 303 of road surface 301, the position of the display target 230 changes downward from the position during the normal traveling. Therefore, the tip of the arrow of the displayed virtual image Iv displayed at the reference position P0 is displaced to the outside of the lane. Therefore, the display system 100 adjusts the display position of the virtual image Iv in the direction of eliminating the displacement according to the posture of the vehicle 200.

Specifically, as shown in FIG. 4C, the correction processing device 50 calculates a correction amount C so that the display position becomes a position P1 where there is no displacement in the display position due to the angle of the vehicle 200. That is, the display processing device 30 sets the display position of the virtual image Iv to "reference position P0+correction amount C". In this manner, the projection device 10 can display the virtual image Iv at the position P1 corresponding to the display target 230. As described above, even in a case where the vehicle 200 leans, the display position of the virtual image Iv is changed from the reference position P0 based on the correction amount C, so that the virtual image Iv can be displayed at the position P1 corresponding to the display target 230 in the actual view.

Figure 5:
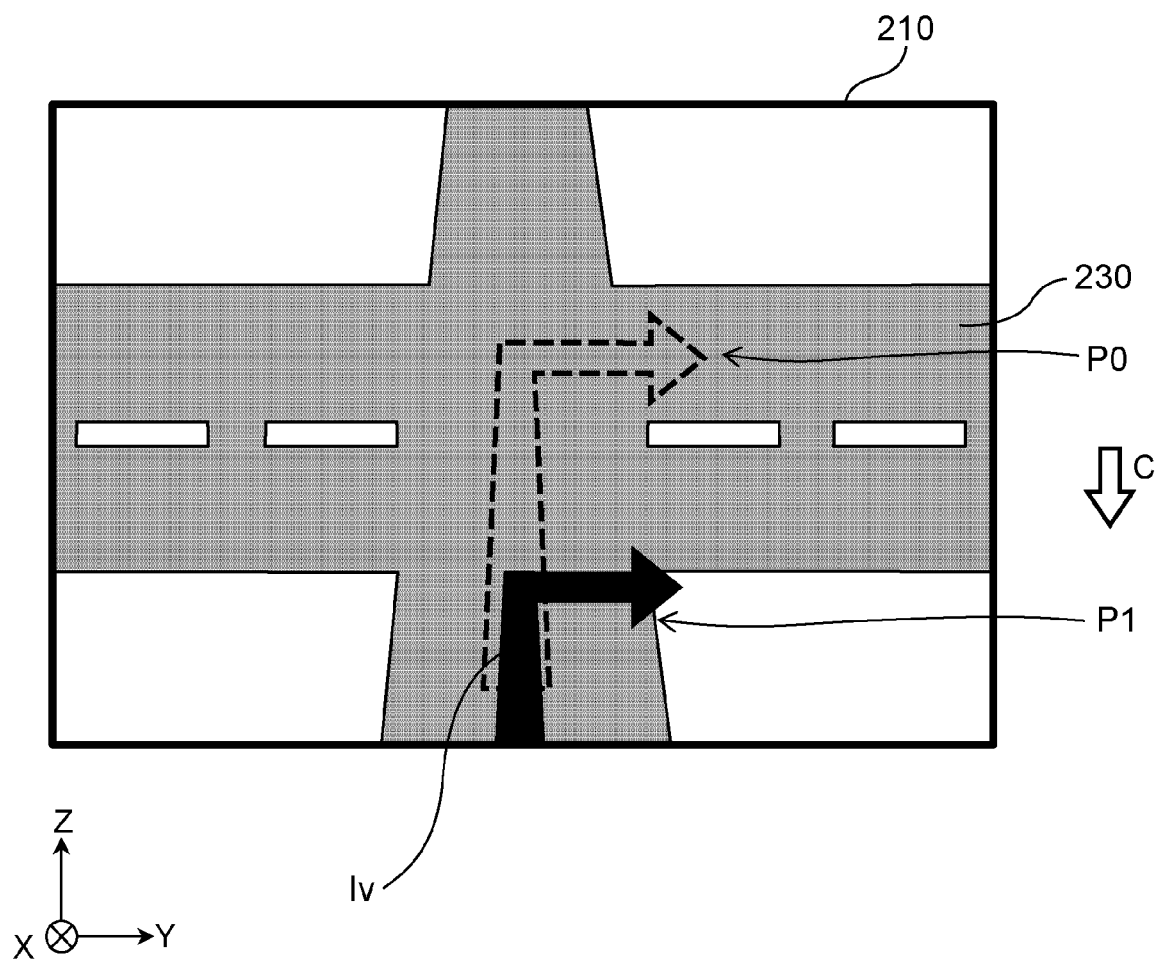
FIG. 5 is a diagram illustrating an example in which position displacement of a corrected virtual image occurs.

However, if the display position of the virtual image Iv is corrected according to the posture change of the vehicle 200, for example, a problem occurs when the vehicle 200 travels on an inclined surface. FIG. 5 is a diagram illustrating a case where the display position of the virtual image Iv is corrected in accordance with the posture change of the vehicle 200, and as a result, the virtual image Iv is displaced from the display target 230.

For example, when the vehicle 200 climbs a slope, the vehicle posture changes before and after the climbing due to the influence of the slope. Therefore, the display position of the virtual image Iv is set to "reference position P0+correction amount C". However, in a case where the vehicle 200 climbs a slope, a difference between the position of the vehicle 200 and the gradient of the road surface of a superimposition destination also changes in addition to the posture change due to the gradient change of the vehicle 200. For this reason, the virtual image Iv cannot be corrected to a correct position by "reference position P0+correction amount C" calculated from the posture change of the vehicle 200. Further, since the vehicle 200 travels in parallel along an inclined surface of the slope, there is a case where it is not necessary to correct the display position of the virtual image Iv, and, as illustrated in FIG. 5, the virtual image Iv is displayed at the position P1 displaced downward from the display target 230 by unnecessary correction processing.

Further, for example, in a case where the vehicle 200 turns a curve, the superimposition destination cannot be visually recognized. For this reason, displaying the virtual image Iv causes a sense of incongruity or discomfort to the viewer.

In the display system 100 of the present embodiment, as described later, the display determiner 52c determines whether or not to display the virtual image Iv on the basis of the variation amount X of the posture change amount of the vehicle 200, and the display processing device 30 controls displays of the virtual image Iv on the basis of a determination results of the display determiner 52c. Specifically, when an absolute value of the variation amount X is more than or equal to the threshold a, the display determiner 52c does not display the virtual image Iv, that is, determines that the display is OFF. Further when an absolute value of the variation amount X is less than the threshold a, the display determiner 52c displays the virtual image Iv, that is, determines that the display is ON. In this manner, the virtual image Iv is not displayed in a case where the virtual image Iv could be displayed at an unintended position, for example, at the time of climbing a slope of at the time of making a turn.

2. Operation of Display Processing Device

Figure 6:
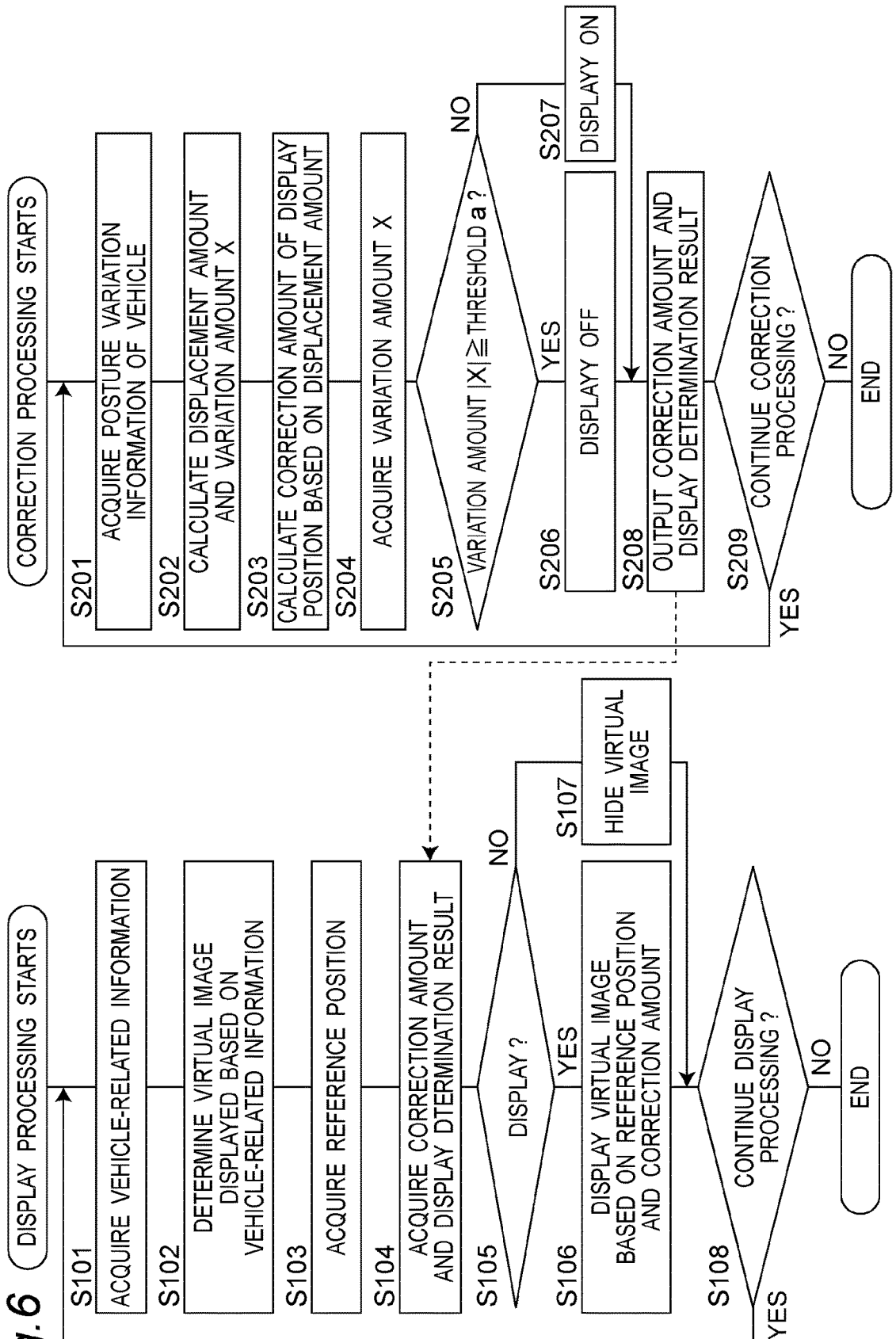
FIG. 6 is a flowchart showing display processing and correction processing in the first embodiment.

FIG. 6 shows display processing performed by the display controller 32 of the display processing device 30 and correction processing performed by the correction controller 52 of the correction processing device 50. The display processing shown in FIG. 6 is started, for example, when the engine of the vehicle 200 is started or when a button for giving an instruction to start displaying the virtual image Iv is operated, and the like.

The display controller 32 acquires the vehicle-related information from the information acquisition device 20 (S101). The display controller 32 determines the virtual image Iv to be displayed based on the vehicle-related information (S102). The display controller 32 acquires the reference position P0 of the virtual image Iv from an external device (S103). The display controller 32 acquires the correction amount C of the display position and the display determination result output from the correction processing device 50 (S104).

The display controller 32 determines whether or not to display the virtual image Iv on the basis of the display determination result (S105). In a case where the display determination result indicates that the display ON, that is, the virtual image Iv is displayed (YES in S105), the display controller 32 causes projection device 10 to display the virtual image Iv based on the reference position P0 and the correction amount C (S106). For example, the display controller 32 reads the image data 331 of the virtual image Iv corresponding to the display target from the storage 33, sets the display position of the virtual image Iv to "reference position P0+correction amount C", and outputs the display position to the projection device 10. In a case where the display determination result indicates that the display if OFF, that is, the virtual image Iv is not displayed (NO in S105), the display controller 32 hides the virtual image Iv (S107).

The display controller 32 determines whether or not to continue the display processing (S108). For example, the display controller 32 ends the display processing when the engine of the vehicle 200 is stopped or when a button for giving an instruction to end the display of the virtual image Iv is operated, and the like. In a case where the display processing is continued, the processing returns to Step S101.

3. Operation of Correction Processing Device

The correction processing shown in FIG. 6 is started, for example, when the engine of the vehicle 200 is started or when a button for giving an instruction to start displaying the virtual image Iv is operated, and the like. The correction processing is started together with the display processing, for example. Note that the correction processing may be started when the button for giving an instruction to start the position correction of the virtual image Iv is operated.

The displacement amount calculator 52a acquires the posture change information indicating the angular velocity output from the gyro sensor 41 (S201). The displacement amount calculator 52a calculates a displacement amount, which is an angle in the pitch direction of the vehicle 200 and the variation amount X in unit time of the posture change amount in the yaw direction based on the acquired posture change information (S202). Specifically, the displacement amount calculator 52a calculates the variation amount in a predetermined unit time of the yaw angle of the vehicle 200 and the pitch angle by integrating and calculating the angular velocity. The correction amount calculator 52b calculates the correction amount C of the display position of the virtual image Iv based on a displacement amount with respect to the pitch directions (S203). Specifically, the correction amount calculator 52b converts the displacement amount of the vehicle 200 in the pitch direction into the number of pixels, and determines the correction amount C that cancels a displacement amount indicated by the number of pixels.

The display determiner 52c acquires the variation amount X (S204). The variation amount X is a change amount of the displacement amount in the yaw direction in a predetermined time. Alternatively, the posture change amount (displacement amount in the yaw direction) may be acquired as the variation amount X. In description below, the variation amount X is the posture change amount or a variation amount in a predetermined unit time of the posture change amount. Then, the display determined 52c compares an absolute value of the variation amount X with the threshold a (S205).

When the absolute value of the variation amount X is more than or equal to the threshold a (YES in S205), the display determiner 52c sets the display determination result to display OFF (S206). In a case where the absolute value of the variation amount X is less that the threshold a (NO in S205), the display determiner 52c sets the display determination result to display ON (S207). The display determiner 52c outputs the correction amount C and the display determination result to the display processing device 30 (S208). The correction controller 52 determines whether or not to continue the correction processing (S209). For example, the correction controller 52 ends the correction processing when the engine of the vehicle 200 is stopped or when a button for giving an instruction to end the display of the virtual image Iv is operated, and the like. In a case where the correction processing is continued, the processing returns to Step S201.

Figure 7A:
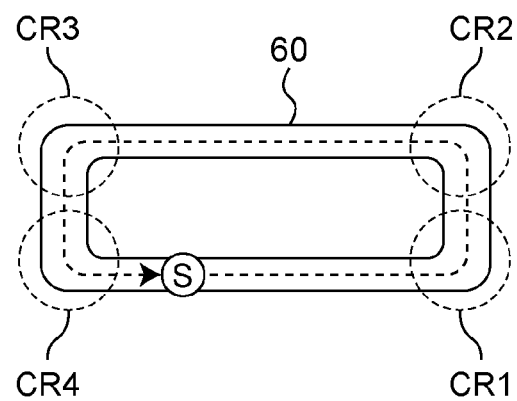
FIG. 7A is a circuit track on which a vehicle travels.
Figure 7B:
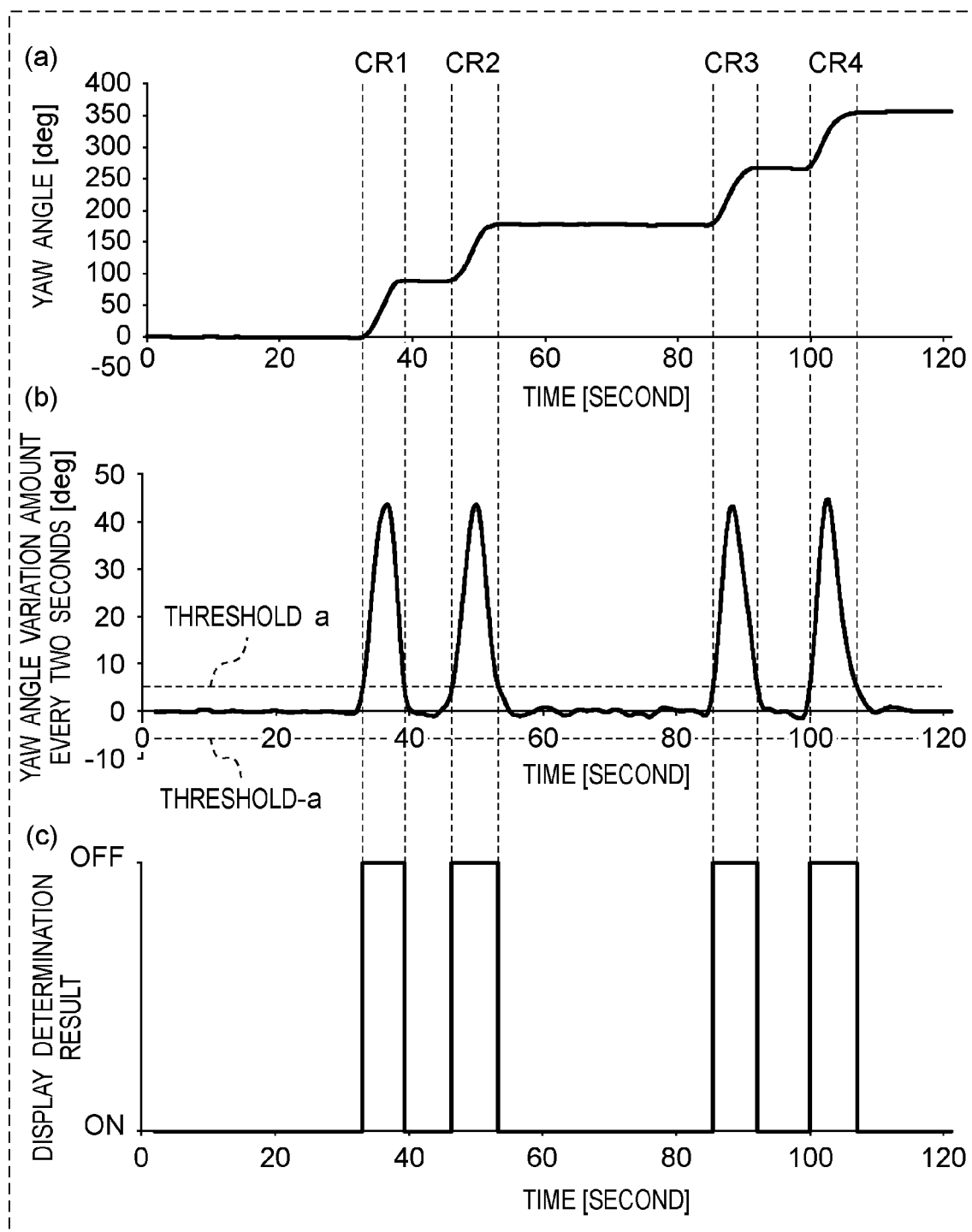
FIG. 7B is a diagram illustrating a relationship between a posture change amount, a variation amount of the posture change amount per unit time, and a display determination result.

FIG. 7A is a diagram illustrating a circuit track on which the vehicle 200 of the present embodiment travels. FIG. 7B is a diagram illustrating a relationship between a posture change amount while the vehicle 200 is traveling on the circuit track of FIG. 7A, a variation amount of the posture change amount per predetermined unit time, and a display determination result. FIG. 7B(a) is a graph showing a change in the yaw angle (posture change amount) detected by the gyro sensor 41. FIG. 7B(b) is a graph showing a variation amount of the yaw angle every two seconds. FIG. 7B(c) is a diagram illustrating a display determination result. Note that, in the present embodiment, the posture change amount indicates the yaw angle of the vehicle 200, and the variation amount of the posture change amount indicates a variation amount of the of the yaw angle in a predetermined unit time. Further, in the present embodiment, the predetermined unit time is set to two seconds.

When the vehicle 200 travels counterclockwise on a circuit track 60 illustrated FIG. 7A started from a start point S, an absolute value of the yaw angle variation amount every two seconds becomes equal to or more than the threshold a as illustrated in FIG. 7B(b) at the start of turning a curve CR1. At this time, as illustrated in FIG. 7B(c), the display determination result is set to display OFF by the display determiner 52c. After the above, at an end point of the curve CR1, an absolute value of the yaw angle variation amount becomes less than the threshold a as illustrated in FIG. 7B(b), and the display determination result is set to display ON as illustrated in FIG. 7B(c). As described above, since the absolute value of the yaw angle variation amount becomes equal to or more than the threshold a while the vehicle 200 turns the curve CR1, the display determination result becomes display OFF, and the virtual image Iv is not displayed. Similarly, while the vehicle 200 is turning curves CR2, CR3, and CR4, the absolute value of the yaw angle variation amount becomes equal to or more than the threshold a, and the display determination result becomes display OFF. In contrast, in a case where the vehicle 200 is traveling other than the curves CR1 to CR4, the yaw angle of the vehicle 200 is substantially constant as shown in FIG. 7B(a), and the absolute value of the yaw angle variation amount every two seconds is less than the threshold a as shown in FIG. 7B(b). For this reason, as illustrated in FIG. 7B(c), the display determination result becomes display ON and the virtual image Iv is displayed.

The magnitude of the yaw angle during traveling is detected by the gyro sensor 41. When the vehicle 200 enters a curve, the traveling direction of the vehicle 200 changes, and the yaw angle greatly changes. The variation amount X of the yaw angle is calculated every predetermined unit time T1. Note that, in FIG. 7B, the unit time T1 is set to two seconds. For example, when (time, yaw angle)=(t, y1) and (t+T1, y2), the variation amount X is calculated by X=(y2−y1)/(t+T1−t)=(y2−y1)/T1.

When the absolute value of the variation amount X is more than or equal to the threshold a (|X|≥a), the display determiner 52c detemines not to display the virtual image Iv and sets the display determination result to display OFF. As shown in FIG. 7B, after about 33 seconds from the start of traveling, the vehicle 200 enters the curve CR1. For this reason, the absolute value of the variation amount X of the yaw angle becomes equal to or more than the threshold a, and the display determination result is set to display OFF. The display controller 32 performs control so that the virtual image Iv is not displayed on the basis of the display determination result. Further, after about 40 seconds from the start of traveling, the vehicle 200 has passed through the curve CR1 and started to travel straight. For this reason, the absolute value of the variation amount X of the yaw angle becomes less than the threshold a, and the display determination result is set to display ON. The display controller 32 performs control so that the virtual image Iv is displayed on the basis of the display determination result. The same applies to the other curves CR2 to CR4.

4. Effect, Supplement, and the Like

The display system 100 of the present disclosure includes the display processing device 30 that controls display of the a virtual image Iv, the posture detection device 40 that detects a variation amount of a posture change amount of the vehicle 200, the correction processing device 50 that sets a correction amount of a display position of the virtual image Iv on the basis of the variation amount, and the display determiner 52c that determines whether or not to display the virtual image Iv. The display processing device 30 controls the display of the virtual image Iv on the basis of the determination result of the display determiner 52c and the correction amount C.

This can reduce a sense of incongruity or discomfort given to the viewer.

The display determiner 52c determines whether or not to display the virtual image Iv on the basis of the variation amount X of the posture change amount in the unit time, and thus, for example, it is possible to perform control such that the virtual image Iv is not displayed while the vehicle is turning a curve. In a case where the virtual image Iv could be displayed at an unintended position, it is possible to reduce a sense of incongruity or discomfort given to the viewer by performing control so as not to display the virtual image Iv.

Further, the display system 100 of the present embodiment further includes the projection device 10 that projects light representing the virtual image Iv. In the present embodiment, the moving body is a vehicle, and the image is a virtual image displayed in front of a windshield of the vehicle. According to the present embodiment, it is possible to prevent a virtual image from being displayed at an unintended position due to a posture change of the vehicle.

Note that, in the present embodiment, whether or not to display the virtual image Iv is determined using the yaw direction of the vehicle as a direction of a posture change. However, the direction of the posture change may be either the pitch direction or the roll direction of the vehicle. Alternatively, a plurality of these directions may be combined.

Second Embodiment

In the first embodiment, the display determiner determines whether or not to display virtual image Iv on the basis of the variation amount X of the posture change detected by the gyro sensor. Specifically, the display determiner determines not to display the virtual image Iv when the absolute value of the variation amount X is more than or equal to the threshold a, and determines to display the virtual image Iv when the absolute value of the variation amount X is less than the threshold a. The present embodiment includes a gradient change detector, and it is determined whether or not to display the virtual image Iv on the basis of detection of change in the gradient by the gradient change detector.

Figure 8:
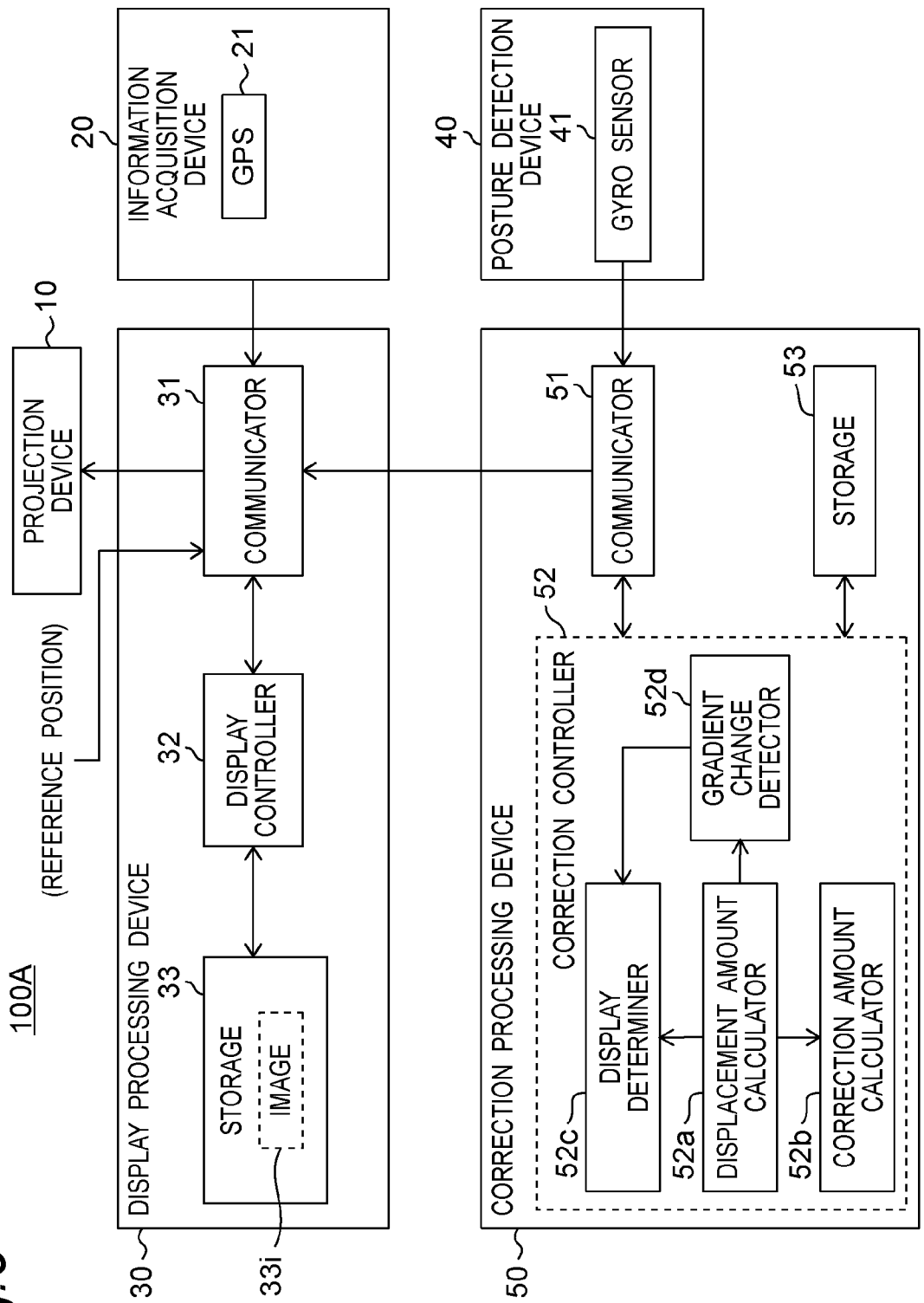
FIG. 8 is a block diagram illustrating an internal configuration of the display system according to a second embodiment.
Figure 9:
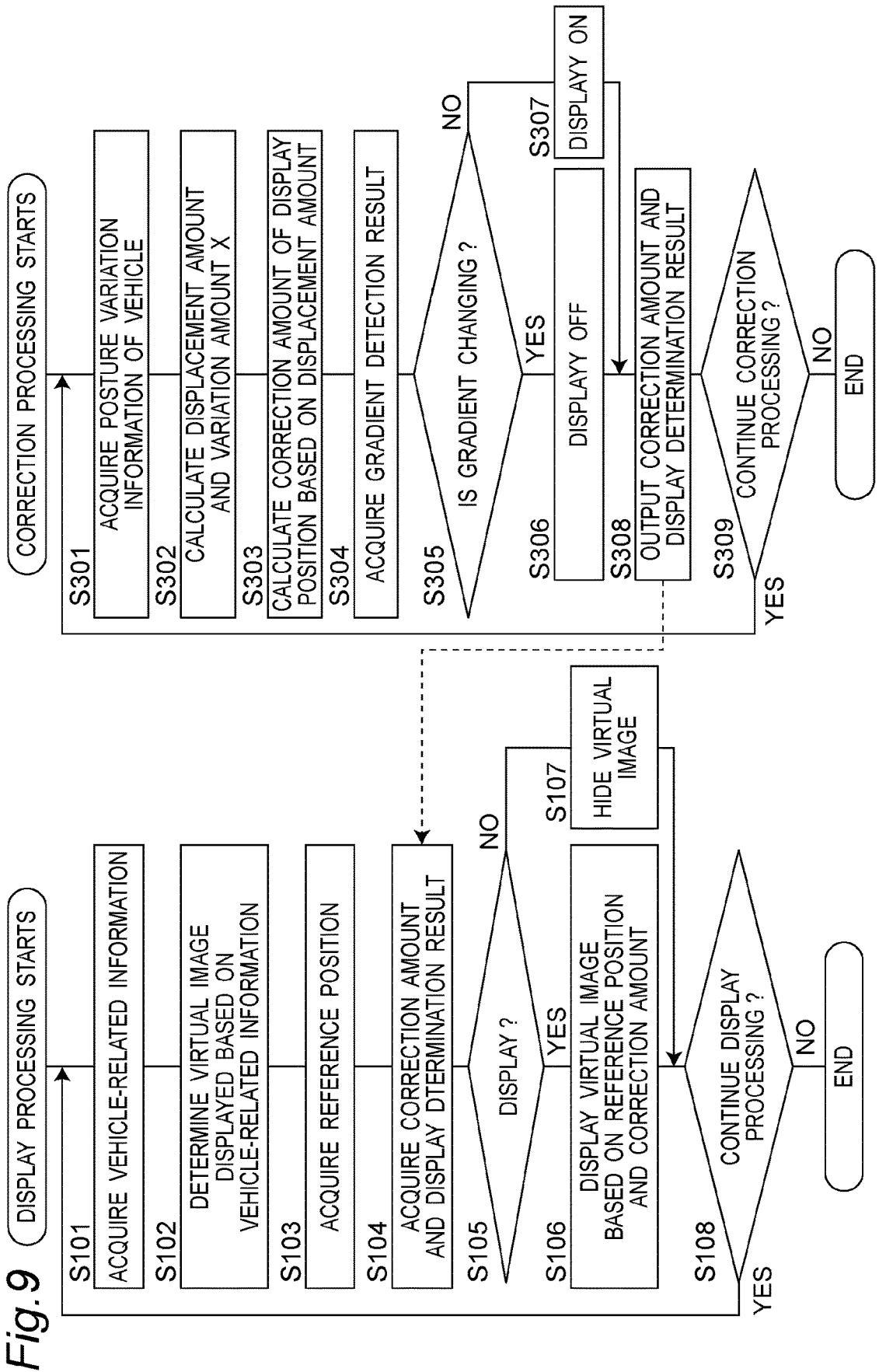
FIG. 9 is a flowchart showing correction processing and display processing in the second embodiment.
Figure 10:
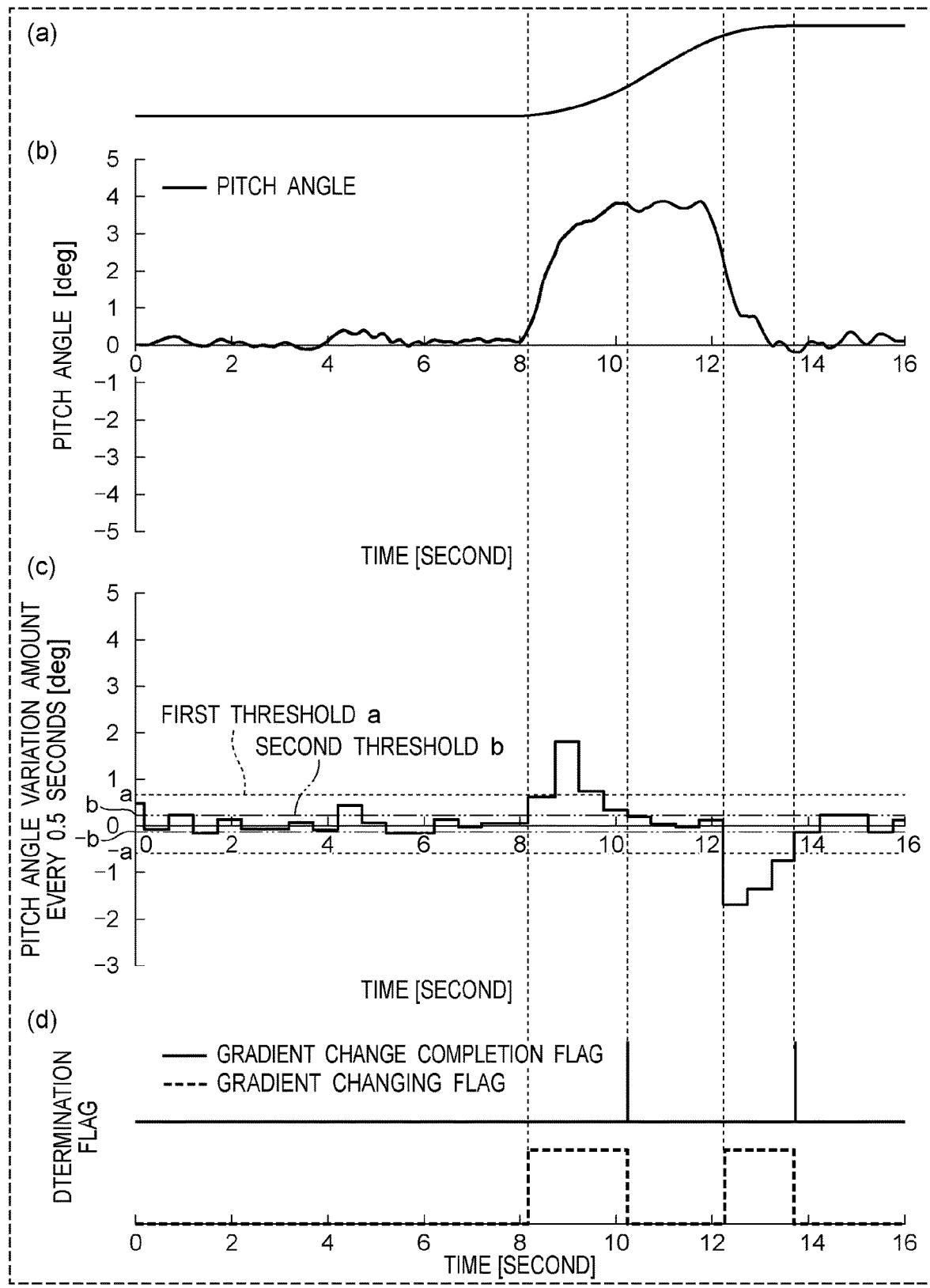
FIG. 10 is a diagram illustrating a relationship between an inclined traveling path, a posture change amount in a pitch direction, a variation amount of a pitch angle for each predetermined time, and a gradient change flag.

FIG. 8 is a block diagram illustrating an internal configuration of a display system 100A according to a second embodiment. The display system 100A according to the second embodiment has a configuration in which a gradient change detector 52d is added to the correction controller 52 of the correction processing device 50 according to the first embodiment. FIG. 9 shows the display processing and the correction processing in the second embodiment. The display processing of the second embodiment is the same as the display processing of the first embodiment. Further, Steps S301 to S303 and Steps S308 to S309 of the correction processing are the same as Steps S201 to S203 and Steps S208 to S209 of the correction processing of the first embodiment. FIG. 10 is a diagram illustrating a relationship between an inclined traveling path on which the vehicle 200 of the present embodiment travels, a change in the pitch angle (posture change amount) of the vehicle 200, a variation amount of the pitch angle per predetermined time, and a gradient changing flag and a gradient change completion flag. FIG. 10(a) illustrates an example of a slope on which vehicle 200 climbs. FIG. 10(b) is a graph showing a change in the pitch angle detected by the gyro sensor 41. FIG. 10(c) is a graph showing a variation amount of the pitch angle every 0.5 seconds. FIG. 10(d) is a diagram illustrating ON and OFF of the gradient changing flag and ON and OFF of the gradient change completion flag.

The displacement amount calculator 52a acquires the posture change information indicating the angular velocity output from the gyro sensor 41 (S301). The displacement amount calculator 52a calculates a displacement amount, which is an angle in the pitch direction of the vehicle 200 and the variation amount X in unit time of the posture change amount based on the acquired posture change information (S302). The correction amount calculator 52b calculates the correction amount C of the display position of the virtual image Iv based on the a displacement amount with respect to the pitch direction (S303).

The gradient change detector 52d determines whether or not the gradient of the traveling path on which the vehicle 200 travels changes based on an output of the posture detection device 40. The gradient change detector 52d detects a change in the gradient of the traveling path on the basis of a rotational movement amount about the right and left axes with respect to the traveling direction of the vehicle 200, that is, the posture change amount in the pitch direction. As a detection result of the gradient change detector 52d, for example, when the vehicle 200 starts to climb a slope, gradient changing flag ON in set. Further, when entry of the vehicle 200 to a slope in completed and the posture of the vehicle 200 becomes parallel to the gradient of the traveling path, gradient change completion flag ON is set and the gradient changing flag is set to OFF.

For example, in a case where the vehicle 200 climbs the slops illustrated in FIG. 10(a), when the vehicle 200 starts to enter the slope, as illustrated in FIGS. 10(b) and 10(c), the variation amount X of the pitch angle exceeds the first threshold a when the time exceeds eight seconds. At this time, the gradient change detector 52d sets the gradient changing flag to ON as illustrated in FIG. 10(d). That is, the correction controller 52 determines that the posture variation of the vehicle 200 is started due to a change in the gradient of the traveling path. In a case where the gradient changing flag is ON, the gradient change detector 52d compares the absolute value of the variation amount X with a second threshold b. In a case where the variation amount X is smaller than the second threshold b, the gradient change detector 52d sets the gradient change completion flag to ON. When the gradient change completion flag is set to ON, the gradient changing graph is set to OFF.

Similarly, the gradient changing flag ON is set when the vehicle 200 starts to exit from the slope to a flat ground, and the gradient change completion flag ON is set when the vehicle 200 completely exits to the flat ground. The display determiner 52c acquires these flags from the gradient change detector 52d as a gradient detection result (S304). The display determiner 52c determines whether or not the posture change due to the gradient change of the vehicle 200 is completed based on the acquired gradient detection result (S305). In a case where the gradient detection result is gradient changing flag ON, that is, indicated that the gradient is changing (YES in S305), the display determiner 52c sets the display determination result to display OFF (S306). In a case where the gradient detection result is gradient change completion flag ON, that is, indicates that the gradient is not changing (NO in S305), the display determiner 52c sets the display determination result to display ON (S307).

The display determiner 52c outputs the correction amount C and the display determination result to the display processing device 30 (S308). The correction controller 52 determines whether or not to continue the correction processing (S309). For example, the correction controller 52 ends the correction processing when the engine of the vehicle 200 is stopped or when a button for giving an instruction to end the display of the virtual image Iv is operated, and the like. In a case where the correction processing is continued, the processing returns to Step S301.

Note that, in a case where the posture change amount (angle in the pitch direction) is the variation amount X, the variation amount X is shown by the graph FIG. 10(b). In this case, since it is not possible to determine whether or not the gradient change is completed, a variation amount X' of the posture change amount per unit time is preferably provided separately.

In the first embodiment, the display determiner 52c determines whether or not to display the virtual image Iv on the basis of the yaw angle variation amount of the vehicle 200. On the other hand, in the present embodiment, it is possible to determine whether or not to display the virtual image Iv on the basis of a change in the inclination in the pitch direction of the vehicle 200.

As describe above, the display determiner 52c determines whether or not to display the virtual image Iv on the basis of the gradient detection result of the gradient change detector 52d, so that, for example, when a posture change of the vehicle 200 is large at the time of entering or exiting a slope, it is possible to perform control so as not to display the virtual image Iv. In this manner, the virtual image Iv is not displayed in a situation in which a gradient difference between a road surface at the own vehicle position and a road surface as the superimposition destination changes sometimes while the vehicle enters a slope, or in a situation in which the superimposition destination cannot be visually recognized, that is, in a situation in which superimposing property is deteriorated. For this reason, a sense of incongruity or discomfort given to the viewer can be reduced, and safety can be improved.

Although entry to a slope can be determined to some extent from the GPS and route information (including altitude information), the gyro sensor can detect a change in inclination with higher accuracy by high-speed sampling than a combination of the GPS and the route information. Therefore, by using the gyro sensor as in the present embodiment, it is possible to perform the determination of entry to a slope at high speed and with high accuracy.

In many cases, since a change in the gradient while the vehicle enters a slope is larger than the posture change of the vehicle due to unevenness of a road surface, there is possibility that a slight determination error leads to a large display displacement. For this reason, when high-speed and high-accuracy determination is performed by the gyro sensor, a sense of incongruity or discomfort given to the viewer can be reduced and safety can be improved.

Other Embodiments

As described above, the embodiments have been described as an example of the technique disclosed in the present application. However, the technique in the present disclosure is not limited to this, and is also applicable to an embodiment in which changes, replacements, additions, omissions, and the like are appropriately made. In view of the about, other embodiments will be exemplified below.

The above embodiment illustrates the case where the projection device 10, the information acquisition device 20, the display processing device 30, the posture detection device 40, and the correction processing device 50 are separate devices. However, a plurality of device may be integrally formed as one device. For example, the display processing device 30 and the correction processing device 50 may be integrally formed as one device. The information acquisition device 20 and the display processing device 30 may be integrally formed as one device. The posture detection device 40 and the correction processing device 50 may be integrally formed as one device. The separately formed devices are connected in a manner communicate with each other by wire or wirelessly. Note that all the projection device 10, the information acquisition device 20, the display processing device 30, the posture detection device 40, and the correction processing device 50 may be formed as one device. In this case, the communicators 31 and 51 may be omitted.

The above embodiment describes the example in which the information acquisition device 20 includes the GPS module 21. However, the information acquisition device 20 may include a distance sensor that measures a distance and a direction from the vehicle 200 to a surrounding object, and may output distance information indicating the measure distance and direction to the display processing device 30. The information acquisition device 20 may include a vehicle speed sensor that detects the speed of the vehicle 200, or may include a navigation system. The information acquisition device 20 may include one or more of the GPS module 21, the distance sensor, the camera, and the like. In this case, the GPS module 21, the distance sensor, the camera, and the like having a function as the information acquisition device 20 may be built in one device or individually attached to the vehicle 200.

The above embodiment describes the example in which the posture detection device 40 includes the gyro sensor 41. However, the posture detection device 40 may include an acceleration sensor that detects the acceleration of the vehicle 200, and may output the detected acceleration as the posture change information. The posture detection device 40 may include a vehicle height sensor that detects the height from the road surface, and may output the detected height as the posture change information. The posture detection device 40 may include other publicly-known sensors. The posture detection device 40 may include one or more of the gyro sensor 41, the acceleration sensor, the vehicle speed sensor, and the like. In this case, the gyro sensor 41, the acceleration sensor, the vehicle height sensor, and the like having the function of the posture detection device 40 may be built in one device or individually attached to the vehicle 200.

In the above embodiment, the correction processing device 50 includes the display determiner 52c. However, the display processing device 30 may include the display determiner. Further, in the above-described embodiment, the display determiner 52c performs signal processing on the output of the gyro sensor 41 to determine whether or not to display the virtual image Iv. However, for example, the display determiner 52c may determine whether or not to display the virtual image Iv using a calculation result of the displacement amount calculator 52a.

In the above embodiment, the display determiner 52c determines whether or not to display the virtual image Iv on the basis of the variation amount X of the posture change amount or gradient detection result. However, for example, the determination may by made using at least one or more pieces of information of angular velocity, angle, acceleration, and steering angle. Further, the display determiner 52c may determine whether or not to display the virtual image Iv by using an image acquired by LiDAR, a camera, or the like, altitude information, map data, position information by the GPS 21, or the like.

In the above embodiment, the display determiner 52c determines whether or not to display the virtual image Iv using one threshold. However, for example, different thresholds may be used for the case of setting display ON and the case of setting display OFF.

The above embodiment describes the case where the moving body is the vehicle 200 such as an automobile. However, the moving body is not limited to the vehicle 200. The moving body may be a vehicle that travels on the ground, and may be, for example, a train or a motorcycle. The moving body may be an unmanned aircraft that is capable of autonomous driving.

The above embodiment describes the case where the image is displayed in front of the moving body. However, the position where the image is displayed is not limited to the front. For example, the image may be displayed in the side direction or in the rear of the moving body.

The above embodiment describes the example in which the display systems 100 and 100A are an HUD system. However, the display systems 100 and 100A do not need to be an HUD system. The display systems 100 and 100A may include a liquid crystal display or an organic EL display instead of the projection device 10. The display systems 100 and 100A may include a screen and a projector.

Outline of Embodiment (1) A display system of the present disclosure includes a display processing device that controls display of an image, a posture detection device that detects a posture change amount of a moving body, a correction processing device that sets a correction amount of a display position of the image based on the posture change amount, and a display determiner that determines whether or not to display the image. The display processing device controls display of the image based on a determination result of the display determiner and the correction amount. In this manner, a virtual image can be displayed without a sense of incongruity or discomfort given to the viewer.

(2) In this display system of (1), the correction processing device may include a display determiner.

(3) In the display system of (1) or (2), the display determiner may determine not to display the image when an absolute value of the posture change amount or a variation amount in a predetermined unit time of the posture change amount is more than or equal to a predetermined threshold.

(4) In the display system of (1) to (3), the display determiner may determine to display the image when an absolute value of the posture change amount or a variation amount in a predetermined unit time of the posture change amount is less than a predetermined threshold.

(5) In the display system of (3) or (4), the variation amount may include any one or more of a yaw direction, a pitch direction, a roll direction, a direction parallel to a roll axis, a direction parallel to a pitch axis, and a direction parallel to a yaw axis of the moving body.

(6) In the display system of (3), the display determiner may determine not to display the image when the posture change amount or an absolute value of the variation amount in at least one of a yaw direction or a pitch direction of the moving body is equal to or more than the predetermined threshold.

(7) In the display system of (4), the display determiner may determine to display the image when the posture change amount or an absolute value of the variation amount in at least one of a yaw direction or a pitch direction of the moving body is less than the predetermined threshold.

(8) The display system of (5) to (7) may further include a gradient change detector that detects a gradient change of a traveling path based on the posture change amount or the variation amount in the pitch direction, and the display determiner may determine whether or not to display the image based on detection of the gradient change.

(9) In the display system of (5) to (7), the posture detection device may calculate the posture change amount by using at least one or more places of information of angular velocity, angle, acceleration, or steering angle.

(10) In the display system of (8), the gradient change detector may detect that a posture change of the moving body is started due to the gradient change of the traveling path when the posture change amount or an absolute value of the variation amount in the pitch direction is larger than a predetermined first threshold, and detect that a posture change of the moving body is completed due to the gradient of the traveling path when the posture change amount or an absolute value of the variation amount in the pitch direction becomes smaller than a predetermined second threshold after start of a posture change of the moving body due to the gradient change of the traveling path, and the display determiner may determine not to display the image during a period from a time when the start of the posture change is detected by the gradient change detector to a time when completion of the posture change is detected.

(11) In the display system of (8), the gradient change detector may detect that a posture change of the moving body is started due to the gradient change of the traveling path when the posture change amount or an absolute value of the variation amount in the pitch direction is larger than a predetermined first threshold, and detect that a posture change of the moving body is completed due to the gradient of the traveling path when the posture change amount or an absolute value of the variation amount in the pitch direction becomes smaller than a predetermined second threshold after start of a posture change of the moving body due to the gradient change of the traveling path, and the display determiner may determine to display the image in a period other than a period from when the start of the posture change is detected by the gradient change detector to when completion of the posture change is detected.

(12) The display systems of (1) to (11) may further include a projection device that projects light representing the image.

(13) In the display system of (1) to (12), the moving body may be a vehicle, and the image may be a virtual image displayed in front of a windshield of the vehicle.

The projection system described the present disclosure is realized by cooperation with hardware resources, for example, a processor, a memory, and a program, and the like.

INDUSTRIAL APPLICABILITY

The present disclosure can be applied to a display system that displays a virtual image in front of a windshield.

The invention claimed is:

1. A display system comprising:
   a display processing device that controls display of an image;
   a gyroscope sensor that detects a posture change amount in a pitch direction of a moving body, the posture change amount is caused by a gradient change on a traveling path on which the moving body travels;
   a correction processing device that sets a correction amount of a display position of the image based on the posture change amount by converting the posture change amount of the moving body into a number of pixels, and determines the correction amount that cancels the posture change amount indicated by the number of pixels;
   a display determiner that determines whether or not to display the image; and
   a gradient change detector that detects a gradient change of the traveling path based on the posture change amount and a variation amount in a predetermined unit time of the posture change amount, wherein.
   the gradient change detector
      detects that a posture change of the moving body is started due to the gradient change of the traveling path when an absolute value of the posture change amount in the pitch direction of the moving body becomes larger than a predetermined first threshold, and
      detects that the posture change of the moving body is completed due to the gradient change of the traveling path when the absolute value of the variation amount in the pitch direction becomes smaller than a predetermined second threshold after start of the posture change of the moving body due to the gradient change of the traveling path, and
   the display determiner determines not to display the image during a period from a time when the start of the posture change is detected by the gradient change detector to a time when completion of the posture change is detected, and
   the display processing device controls display of the image based on a determination result of the display determiner and the correction amount.

2. The display system according to claim 1, wherein the correction processing device includes the display determiner.

3. The display system according to claim 1, wherein the display determiner determines to display the image when an absolute value of the posture change amount or the variation amount is less than a predetermined threshold.

4. The display system according to claim 1, wherein the display determiner determines not to display the image when an absolute value of the posture change amount in a yaw direction or a variation amount in a yaw direction of the moving body is equal to or more than the predetermined threshold.

5. The display system according to claim 3, wherein the display determiner determines to display the image when an absolute value of the posture change amount in a yaw direction or a variation amount in a yaw direction of the moving body is less than the predetermined threshold.

6. The display system according to claim 1, wherein the display determiner determines to display the image in a period other than the period from the time when the start of the posture change is detected by the gradient change detector to the time when the completion of the posture change is detected.

7. The display system according to claim 1, wherein the posture detection device calculates the posture change amount by using at least one or more pieces of information of angular velocity, angle, acceleration, or steering angle.

8. The display system according to claim 1, further comprising a projection device that projects light representing the image.

9. The display system according to claim 1, wherein the moving body is a vehicle, and the image is a virtual image displayed in front of a windshield of the vehicle.

10. The display system according to claim 2, wherein the display determiner determines not to display the image when an absolute value of the posture change amount or the variation amount is more than or equal to a predetermined threshold.

11. The display system according to claim 1, wherein the display determiner determines to display the image when an absolute value of the posture change amount or the variation amount is less than a predetermined threshold.

12. The display system according to claim 10, wherein the display determiner determines not to display the image when the absolute value of the posture change amount or the variation amount in a yaw direction of the moving body is equal to or more than the predetermined threshold.

13. The display system according to claim 11, wherein the display determiner determines to display the image when the absolute value of the posture change amount or the variation amount in a yaw direction of the moving body is less than the predetermined threshold.

14. The display system according to claim 2, wherein the display determiner determines to display the image in a period other than the period from the time when the start of the posture change is detected by the gradient change detector to the time when the completion of the posture change is detected.

15. The display system according to claim 1, wherein the display determiner determines to display the image in a period other than the period from the time when the start of the posture change is detected by the gradient change detector to the time when the completion of the posture change is detected.

16. The display system according to claim 10, wherein the display determiner determines to display the image in a period other than the period from the time when the start of the posture change is detected by the gradient change detector to the time when the completion of the posture change is detected.

17. The display system according to claim 1, wherein the gradient change detector detects the completion of the posture change of the moving body when the absolute value of the posture change amount in the pitch direction is larger than the first threshold and when the absolute value of the variation amount in the pitch direction is smaller than the second threshold.

18. A display system comprising:
a display processing device that controls display of an image;
a gyroscope sensor that detects a posture change amount in any one or more of a yaw direction, a pitch direction, a roll direction, a direction parallel to a roll axis, a direction parallel to a pitch axis, or a direction parallel to a yaw axis of a moving body, the posture change amount is caused by an angle change on a traveling path on which the moving body travels;
a correction processing device that sets a correction amount of a display position of the image based on the posture change amount by converting the posture change amount of the moving body into a number of pixels, and determines the correction amount that cancels the posture change amount indicated by the number of pixels;
a display determiner that determines not to display the image when an absolute value of the posture change amount or a variation amount in a predetermined unit time of the posture change amount is more than or equal to a predetermined threshold; and
an angle change detector that detects a change in an angle of a traveling path based on the posture change amount and the variation amount, wherein
the angle change detector
  detects that a posture change of the moving body is started due to an angle change of the traveling path when the absolute value of the posture change amount is larger than a predetermined first threshold, and
  detects that the posture change of the moving body is completed due to the angle change of the traveling path when the absolute value of the variation amount becomes smaller than a predetermined second threshold after start of the posture change of the moving body due to the angle change of the traveling path, and
the display determiner determines not to display the image during a period from a time when the start of the posture change is detected by the angle change detector to a time when completion of the posture change is detected, and
the display processing device controls display of the image based on a determination result of the display determiner and the correction amount.

19. The display system according to claim 18, wherein the display determiner determines to display the image in a period other than a period from the time when the start of the posture change is detected by the angle change detector to the time when the completion of the posture change is detected.

20. The display system according to claim 18, wherein the angle change detector detects the completion of the posture change of the moving body when the absolute value of the posture change amount is larger than the first threshold and when the absolute value of the variation amount is smaller than the second threshold.

* * * * *